Patented Oct. 25, 1932

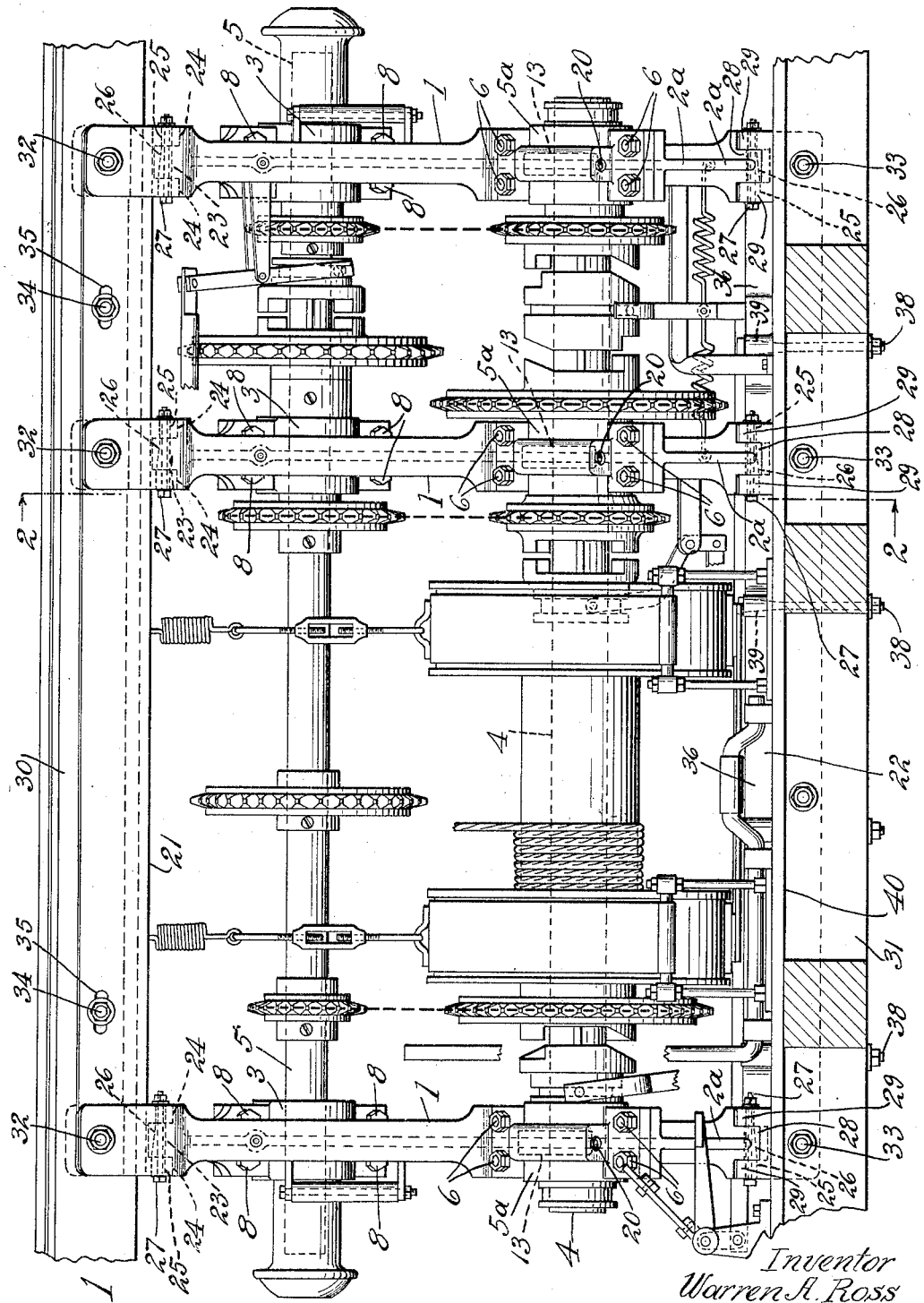

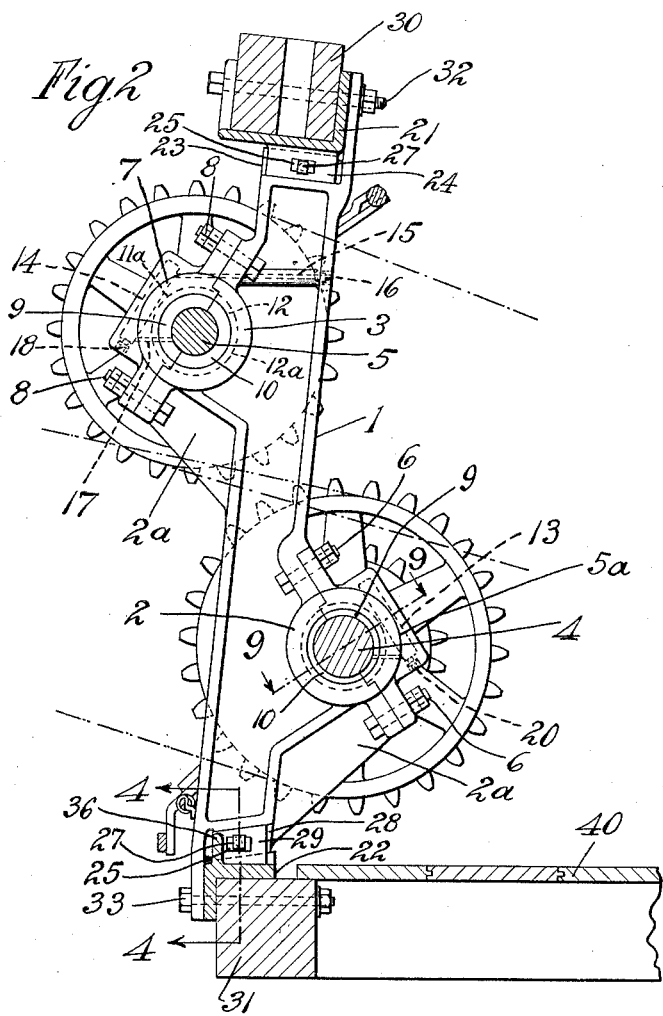
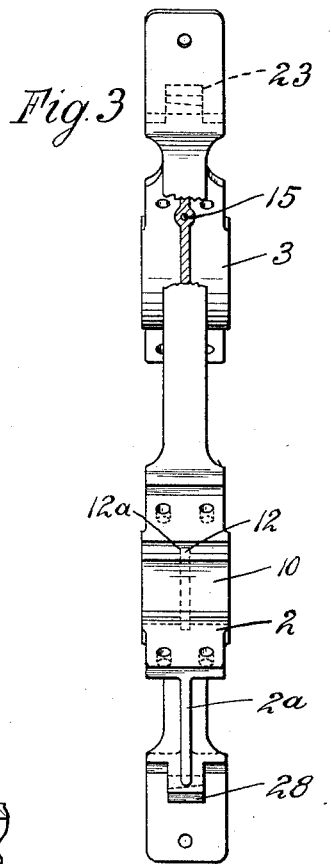
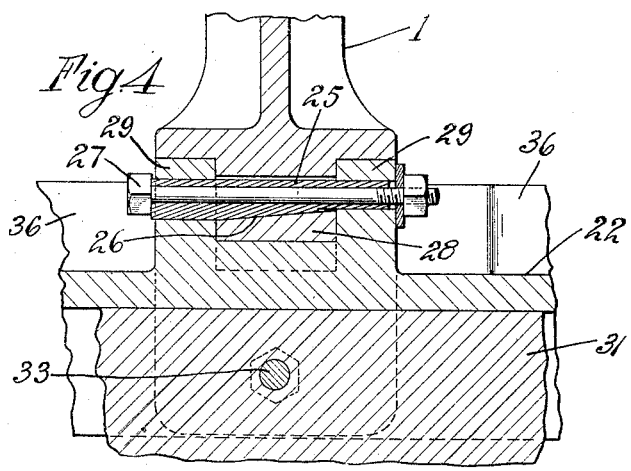
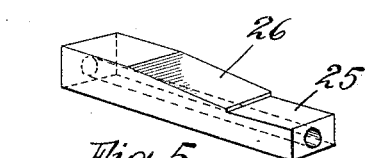

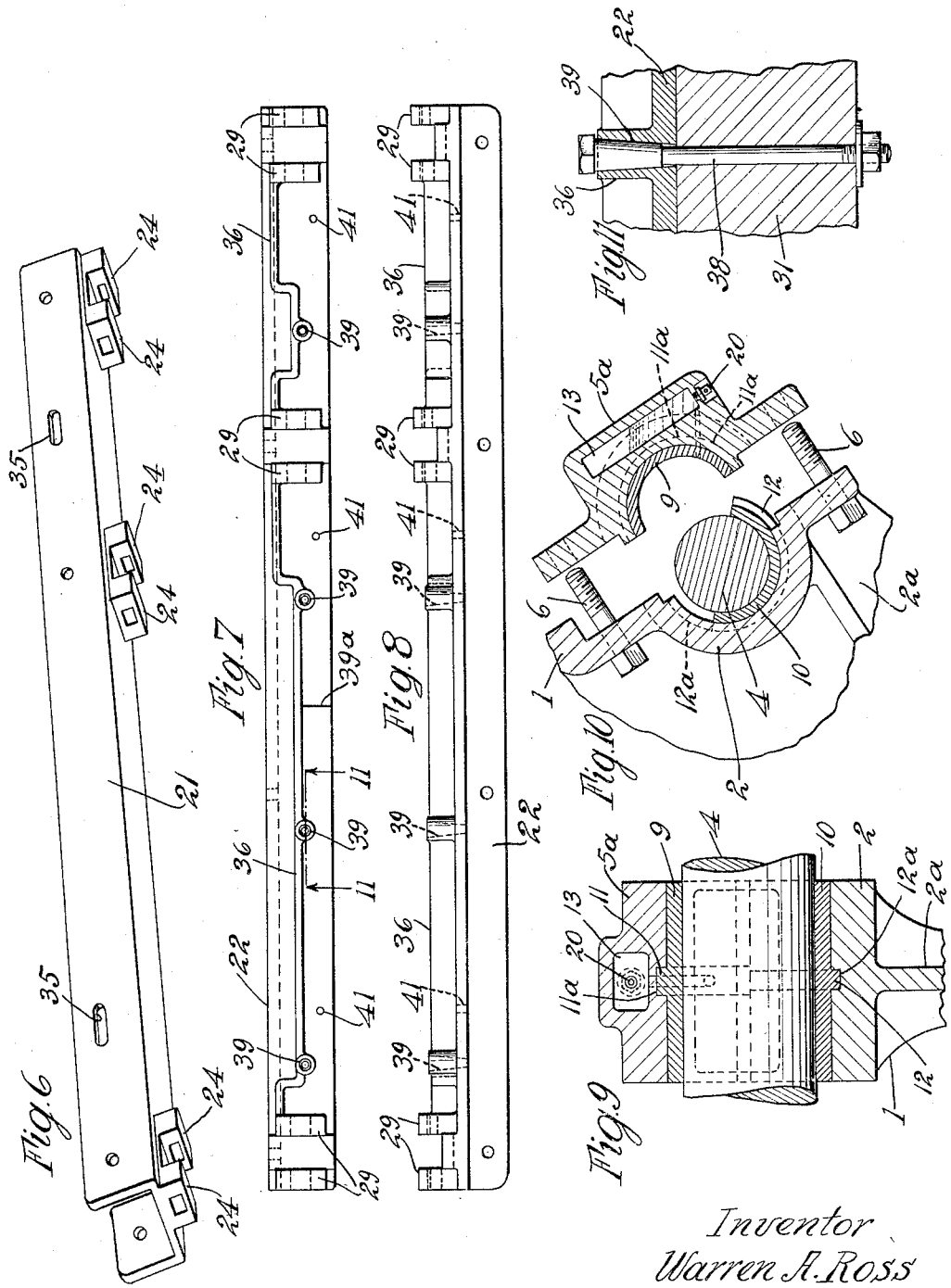

1,884,875

UNITED STATES PATENT OFFICE

WARREN A. ROSS, OF CHICAGO, ILLINOIS, ASSIGNOR OF ONE-FOURTH TO DONALD M. CARTER, OF CHICAGO, ILLINOIS

DRAW WORKS

Application filed March 24, 1928. Serial No. 264,424.

This invention relates to draw works for use in connection with the drilling of wells, and has for its object to provide a new and improved device of this description.

The invention has as a further object to provide a draw works which is simple in construction and strong and rigid when in operation.

The invention has as a further object to provide a draw works that can be easily, quickly and effectively assembled at the point of use.

The invention has further objects which are more particularly pointed out in the accompanying drawings.

Referring now to the drawings, Fig. 1 is a view showing one form of device embodying the invention.

Fig. 2 is a sectional view taken on line 2—2 of Fig. 1.

Fig. 3 is a front elevation of one of the shaft supporting members.

Fig. 4 is an enlarged sectional view taken on line 4—4 of Fig. 2.

Fig. 5 is an enlarged perspective view of one of the connecting pieces.

Fig. 6 is a perspective view of the upper member connecting the shaft supports.

Fig. 7 is a plan view of the lower member connecting the shaft supports.

Fig. 8 is a side elevation of the device shown in Fig. 7.

Fig. 9 is an enlarged sectional view taken on line 9—9 of Fig. 2.

Fig. 10 is a sectional view through one of the bearings for one of the shafts showing the two parts of the bearings separated.

Fig. 11 is an enlarged sectional view taken on line 11—11 of Fig. 7.

Like numerals refer to like parts throughout the several figures.

Referring now to the drawings, I have shown in Fig. 1 one form of draw works having a series of metal shaft supports 1, each having the shaft bearing elements 2 and 3 integral therewith. Mounted in these bearing elements are the shafts 4 and 5. Co-operating with the bearing element 2 is the removable bearing element or cap 5 connected in operative position by the bolts 6. Co-operating with the bearing element 3 is the removable bearing element or cap 7 held in position by the bolts 8. The bearing elements are provided with bushings for the shafts, the bushings being divided into sections 9 and 10. The bushings are provided with means for preventing them from being displaced laterally but which permit them to be moved circumferentially of the shaft.

In the construction herein shown, this result is secured by means of the annular projection 11 on the bushing section 9 which fits into an annular groove 11a in the top bearing member and the annular projection 12 which fits into the annular groove 12a in the lower bearing section. The two annular projections on the bushing sections are different sizes so that when the bushing sections are in position, they cannot rotate with the shaft.

When it is desired to insert the bushings, it is only necessary to remove the upper bearing element or cap, as shown in Fig. 10 and place the annular projections 11 and 12 in proper position with relation to the respective grooves 11a and 12a, and then rotate the bushing sections circumferentially of the shaft so as to bring them into proper position. To remove the bushing sections, it is only necessary to remove the upper bearing section and rotate the bushing sections until they are disconnected from their bearing sections.

In order to insure the proper lubrication of the shafts, the bearing sections 5 and 7 are provided with oil reservoirs 13 and 14. Oil is inserted in the oil reservoir 14 by means of an oil passageway 15 through the support 1 and the bearing members 3 and 7, the oil passageway opening at 16 on the front of the support 1.

An oil passageway 17 leads from the reservoir 14 through the bearing member and the bushing to the shaft, (see Fig. 2). Since the bushings cannot rotate with the shaft, this insures oil being supplied to the bearings when there is oil in the oil reservoirs. The oil reservoir 14 is provided at the bottom with an opening normally closed by the removable plug 18. By moving the plug, the reservoir may be cleaned out. The oil reservoir 13 also is provided at its bottom with an opening closed by a removable plug 20. Oil is inserted in this oil reservoir through this opening by removing the plug 20 and using a forcing device of some kind.

It will be seen that by means of this construction, the oil passageway 15, the bearings for both shafts may be oiled from the platform side of the draw works. The bearing supports 1 are connected together by an aligning member 21 at the top and an aligning member 22 at the bottom. The supporting member 1 and the aligning member 22 are provided with interlocking parts. In the construction shown, the supporting member 1 is provided with a projection 23 which fits in between the projections 24 on the aligning member. The projection 23 is planed off and the face of the aligning member between the projections 24 is planed off or finished so that when the two faces are brought together, the shaft bearings and shafts will be properly aligned. The ends of the projections 24 and the parts of the support 1 which they engage may also be planed or finished so as to have the proper relation with each other. It will be seen that either set of surfaces when properly finished will produce the aligning effect.

Some means is provided for properly connecting the interlocking parts 23 and 24. In the construction shown this is produced by a removable connecting member 25 which passes through openings in the interlocking members and which is preferably provided with an inclined face 26 which engages a similarly inclined face on one of the interlocking members so as to insure the finished aligning faces of the aligning member and the supports to be brought into proper aligning position. The removable connecting piece is held in place by a suitable fastening device which is shown as a bolt 27. The bottom aligning member 22 and the supports 1 are also provided with interlocking parts. The posts are provided with the projections 28 which fit in between the projections 29 on the aligning member. The faces of the aligning member between the projections and the ends of the projections 28 are properly finished in the shop so that when they are brought into contact the shafts and bearings will be properly aligned. The aligning member 22 and the supports 1 are connected together by similar removable connecting pieces 25 similar to those used in connection with the aligning member 21. It will be seen that when the supports 1 and the aligning members 21 and 22 are properly connected together by the connecting pieces 25, the shaft bearings on all of the supports will be in proper alignment and the shafts be properly aligned when in position so as to operate properly.

The aligning members may be connected with the top and bottom cross members 30 and 31 by means of bolts or the like 32 and 33 which also pass through the supports 1. There are also bolts 34 connecting the aligning member 21 with the cross member 30 which bolts pass through elongated slots 35 so as to secure proper adjustment of the parts. The bottom aligning member is provided with a strengthening rib 36, and is fastened to the cross member 31 by the bolts 38. The bolts 38 preferably pass through openings 39 in the ribs 36. The bottom aligning member is preferably provided with a positioning mark 39a which is placed opposite a positioning mark on the cross member 31 of the platform 40 so as to insure the proper location of the member with relation to the platform. This aligning member is also preferably provided with holes 41 for spikes or other fastening devices so as to hold it in proper position while the other parts are being assembled so that after assembly the shafts and parts thereon will be properly located with respect to the vises with which they co-operate. Any of the bearing supporting members may be rocked about the lower shaft 4 so as to bring the bearing 3 into proper position where it may be inspected from the platform 40 by removing the bearing member 7 and the fastening devices 32 and 33 and the wedge connecting pieces 25.

I have shown the shafts 4 and 5 as being provided with the usual parts of the draw works. The aligning faces of the supports 1 and the aligning devices 21 and 22 are properly finished so that when the parts are brought together, the bearings of the shafts will be in proper alignment. It will thus be seen that whenever the device is set up out in the field, and these aligning surfaces brought in proper relation, the bearings of the shafts will always be in alignment. The device may, therefore, be taken down and moved whenever and wherever desired, and when again set up, alignment of the bearings is assured. The bearing supporting members 1 are preferably enlarged at the top and bottom and at the points where the bearings are located and are reduced in size at intermediate points, as clearly shown in Figs. 1 and 3. The bearing members 2 and 3 are preferably provided with strengthening webs 2a.

I claim:—

1. A draw works comprising a plurality of metal bearing supports, bearings supported thereon, metal, aligning members at the top and bottom of said bearing supporting members, the aligning members and bearing supporting members having interlocking parts, aligning faces on the interlocking parts of said bearing supporting members and aligning members which when in engagement, cause the bearings of the bearing members to be brought into proper alignment and means for removably connecting the interlocking parts of the bearing supporting members and the aligning members together.

2. A draw works comprising a plurality of metal bearing supporting members, metal aligning members at the top and bottom of said bearing supporting members, interlocking parts on the bearing supporting members and the aligning members engaging aligning faces on the bearing supporting members and the aligning members and wedge connecting pieces extending through said interlocking parts for insuring the proper contact between said aligning faces when the bearing supporting members and aligning members are assembled.

3. A draw works comprising a plurality of metal bearing supporting members, metal aligning members at the top and bottom of said bearing supporting members, interlocking parts on the bearing supporting members and the aligning members engaging aligning faces on the bearing supporting members and the aligning members and wedge connecting pieces extending through said interlocking parts for insuring the proper contact between said aligning faces when the bearing supporting members and aligning members are assembled and bolts passing through said wedge connecting pieces.

4. A draw works comprising a plurality of metal bearing supporting members, aligning members at the top and bottom of said bearing supporting members, a supporting device for the bottom aligning member, a positioning mark on said bottom aligning member for positioning it with relation to the support by bringing it into proper relation to a positioning mark on the support, aligning faces on said aligning members and said bearing supporting members, and means for fastening the bearing supporting members together so that their aligning faces will be in engagement.

Signed at Bethlehem, county of Northampton and State of Pennsylvania, this 20th day of March, 1928.

WARREN A. ROSS.